(12) United States Patent
Tamura et al.

(10) Patent No.: US 10,350,631 B2
(45) Date of Patent: Jul. 16, 2019

(54) LIQUID DISCHARGE APPARATUS, IMPRINT APPARATUS, AND METHOD OF MANUFACTURING ARTICLE

(71) Applicant: CANON KABUSHIKI KAISHA, Tokyo (JP)

(72) Inventors: Takefumi Tamura, Tokyo (JP); Tsuyoshi Arai, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 47 days.

(21) Appl. No.: 15/343,611

(22) Filed: Nov. 4, 2016

(65) Prior Publication Data

US 2017/0129235 A1 May 11, 2017

(30) Foreign Application Priority Data

Nov. 6, 2015 (JP) .................................. 2015-218794
Oct. 24, 2016 (JP) .................................. 2016-208037

(51) Int. Cl.
*B05C 5/00* (2006.01)
*B41J 2/00* (2006.01)
*B33Y 30/00* (2015.01)

(52) U.S. Cl.
CPC ................ *B05C 5/00* (2013.01); *B33Y 30/00* (2014.12); *B41J 2/00* (2013.01)

(58) Field of Classification Search
CPC ......... B29C 64/209; B29C 64/106–112; G03F 7/0002; B41J 29/377
See application file for complete search history.

(56) References Cited

U.S. PATENT DOCUMENTS

| 6,129,020 A * | 10/2000 | Speck ..................... B41F 13/00 101/425 |
| 6,301,905 B1 * | 10/2001 | Gallus ..................... A23L 3/022 426/405 |
| 7,753,488 B2 * | 7/2010 | Imai ..................... B41J 2/17503 347/49 |

(Continued)

FOREIGN PATENT DOCUMENTS

| JP | 2009160710 A | 7/2009 |
| JP | 2012079969 A | 4/2012 |

(Continued)

OTHER PUBLICATIONS

Office Action issued in Korean Appln. No. 10-2016-0146428 dated May 31, 2019.

*Primary Examiner* — Alison L Hindenlang
*Assistant Examiner* — George W. Brady
(74) *Attorney, Agent, or Firm* — Rossi, Kimms & McDowell LLP

(57) ABSTRACT

A liquid supply apparatus which supplies a liquid to an object, includes a discharger configured to discharge a liquid; a driving mechanism configured to arrange the discharger at a plurality of positions including a first position and a second position; a first exhaust port arranged so as to face the discharger arranged at the first position and configured to exhaust heat generated by the discharger arranged at the first position; and a second exhaust port arranged so as to face the discharger arranged at the second position and configured to exhaust heat generated by the discharger arranged at the second position.

14 Claims, 9 Drawing Sheets

(56) References Cited

U.S. PATENT DOCUMENTS

| | | | | |
|---|---|---|---|---|
| 9,399,240 B2* | 7/2016 | Hung | ............... | B05D 1/18 |
| 2002/0057312 A1* | 5/2002 | Watanabe | ............ | B41J 2/1408 |
| | | | | 347/56 |
| 2008/0284815 A1* | 11/2008 | Kubo | ............... | B41J 2/16523 |
| | | | | 347/30 |
| 2009/0323280 A1* | 12/2009 | Wu | ............... | H05K 7/20181 |
| | | | | 361/690 |
| 2012/0080820 A1* | 4/2012 | Narioka | ............ | G03F 7/0002 |
| | | | | 264/293 |
| 2013/0328963 A1* | 12/2013 | Domae | ............ | B41J 29/377 |
| | | | | 347/18 |
| 2015/0132480 A1* | 5/2015 | Daum | ............... | B05C 5/025 |
| | | | | 427/207.1 |
| 2015/0321494 A1* | 11/2015 | Suzuki | ............ | B41J 29/377 |
| | | | | 347/17 |
| 2016/0016423 A1* | 1/2016 | Mauck | ............ | B41J 29/06 |
| | | | | 347/110 |
| 2016/0039126 A1* | 2/2016 | Tan | ............... | G03F 7/0002 |
| | | | | 264/40.5 |

FOREIGN PATENT DOCUMENTS

| | | | |
|---|---|---|---|
| JP | 2014136321 A | 7/2014 | |
| JP | 2015136859 A | 7/2015 | |

\* cited by examiner

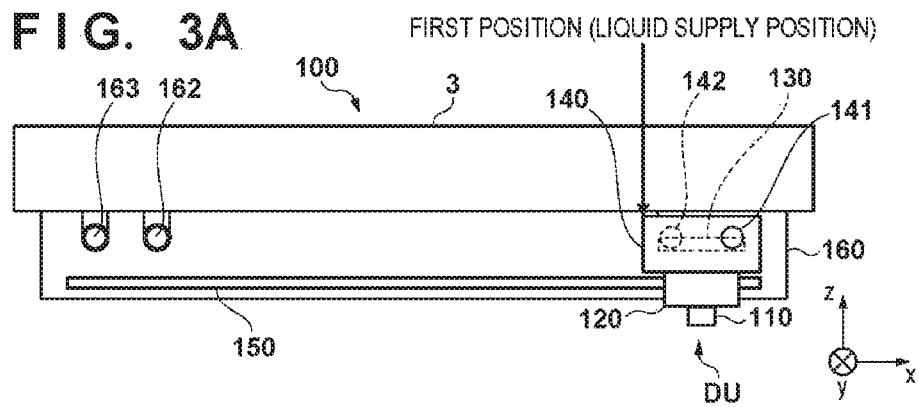
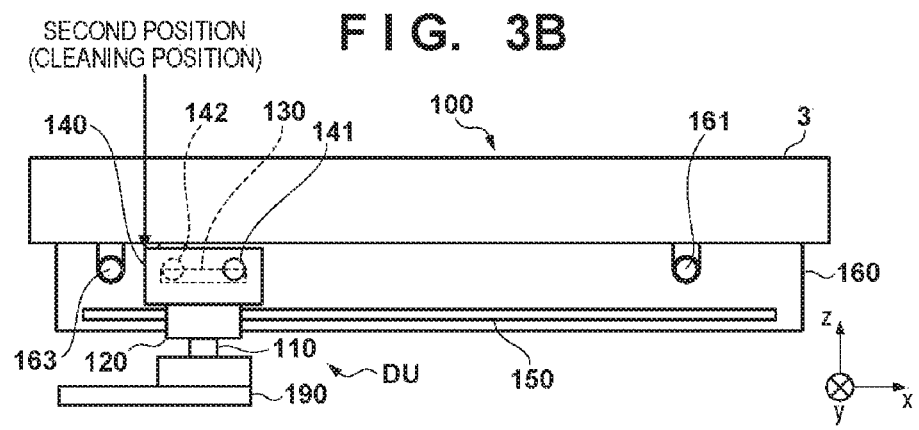
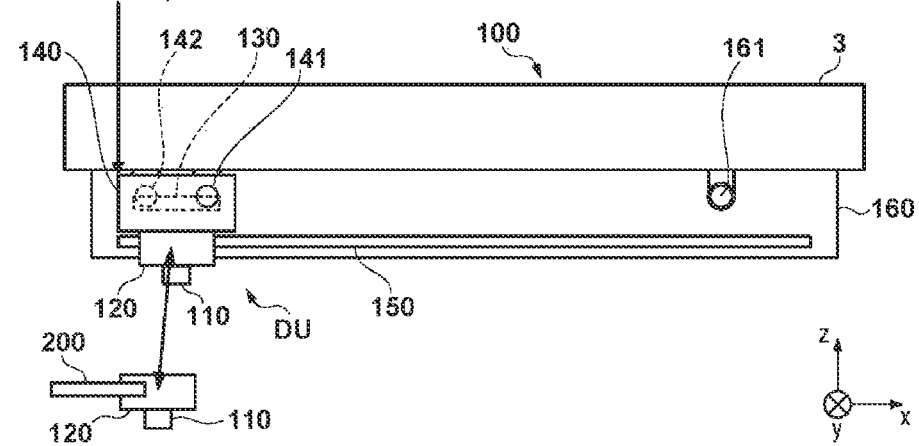

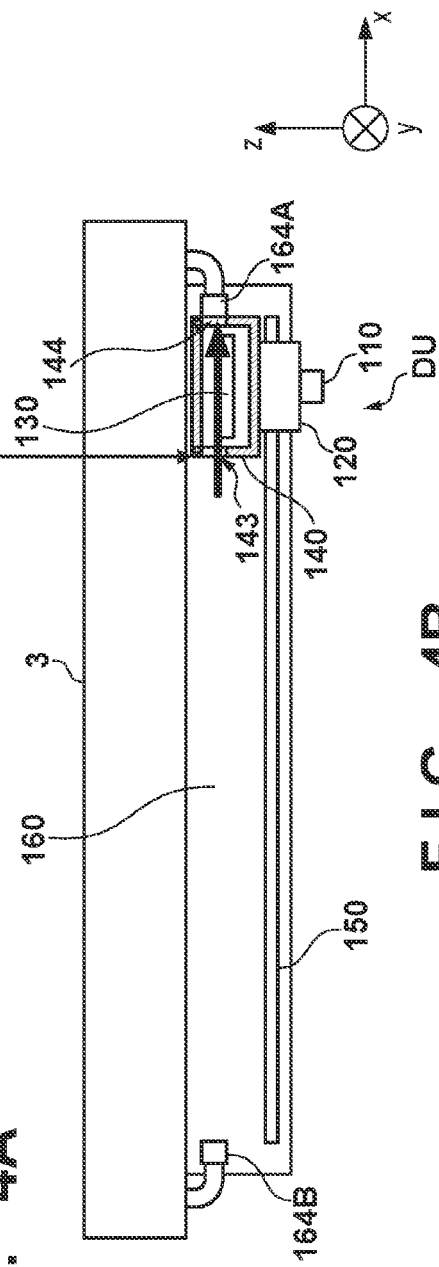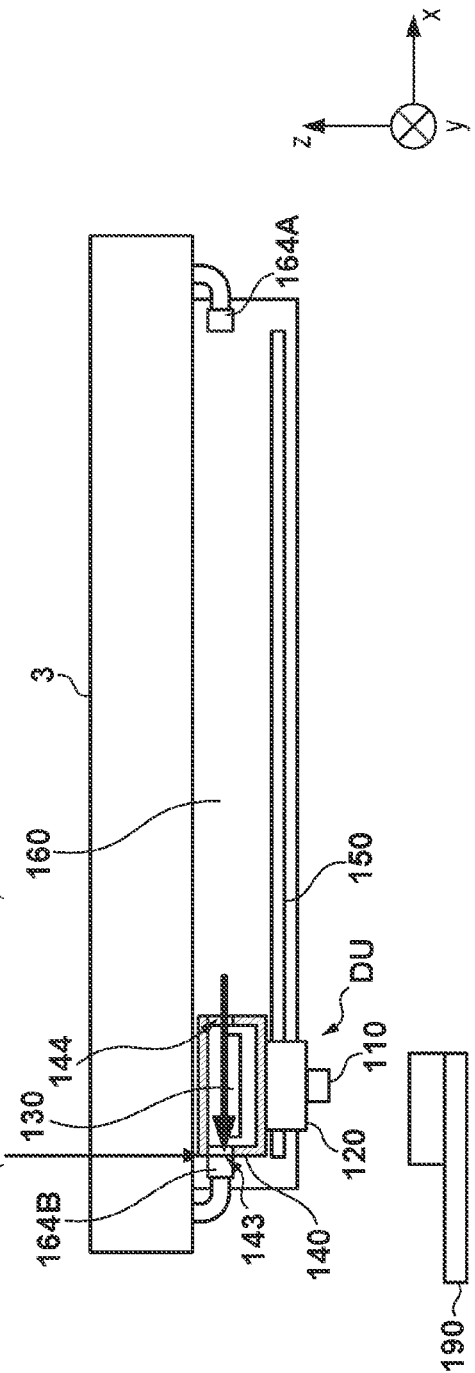

LIQUID DISCHARGE APPARATUS, IMPRINT APPARATUS, AND METHOD OF MANUFACTURING ARTICLE

BACKGROUND OF THE INVENTION

Field of the Invention

The present invention relates to a liquid discharge apparatus, an imprint apparatus which includes the liquid discharge apparatus, and a method of manufacturing an article by using the imprint apparatus.

Description of the Related Art

An imprint apparatus which supplies an imprint material onto a substrate, bring a mold into contact with the imprint material, and cures the imprint material in that state, thereby forming a pattern on the substrate has received attention as a new lithography apparatus. A liquid supply apparatus can be used to supply the imprint material onto the substrate. For example, the liquid supply apparatus discharges an imprint material in a liquid state via an orifice provided in a discharge head. An electric component controls discharge of the liquid from the orifice in the discharge head. In an operation of the liquid supply apparatus, the electric component generates heat, and this generated heat increases a surrounding temperature. This may deform the substrate and the mold or a part of the imprint material, or deteriorate measurement precision for alignment between the substrate and the mold. It is therefore necessary to reduce a problem of heat generated in a liquid discharge apparatus to an ignorable degree in order to form the pattern with high precision. The problem of the heat generated by the liquid supply apparatus may also come to light in accordance with strictness of required specifications in a case in which, for example, the liquid supply apparatus is applied to another apparatus such as a 2D or 3D printer.

There is Japanese Patent Laid-Open No. 2009-160710 as a related art literature related to a heat problem. Japanese Patent Laid-Open No. 2009-160710 describes a robot controller with a contrived exhaust heat method. The robot controller includes a chassis which stores a heating element, the first duct with one end internally communicating with a housing and the other end communicating with an external space of the chassis, and the second duct with one end internally communicating with the housing and the other end communicating with the external space of the chassis, the second duct including an exhaust fan inside. The robot controller also includes the third duct with one end communicating with a space surrounded by the housing and the chassis, and the other end communicating with the external space and the fourth duct with one end communicating with the space surrounded by the housing and the chassis, and the other end communicating with the external space, the fourth duct including an exhaust fan inside.

Japanese Patent Laid-Open No. 2009-160710 does not consider movement of the heating element. If the housing is configured to allow movement of the heating element, the housing is upsized, and so is the chassis which stores it. Moreover, in such a configuration, when an apparatus which includes the heating element processes a processing object, it is difficult to arrange the housing and the chassis which stores it between the apparatus and the processing object.

SUMMARY OF THE INVENTION

The present invention provides a technique advantageous in effectively removing heat generated by a discharger which discharges a liquid in a liquid supply apparatus where the discharger moves.

The present invention provides a liquid supply apparatus which supplies a liquid to an object, the apparatus comprising: a discharger configured to discharge a liquid; a driving mechanism configured to arrange the discharger at a plurality of positions including a first position and a second position; a first exhaust port arranged so as to face the discharger arranged at the first position and configured to exhaust heat generated by the discharger arranged at the first position; and a second exhaust port arranged so as to face the discharger arranged at the second position and configured to exhaust heat generated by the discharger arranged at the second position.

Further features of the present invention will become apparent from the following description of exemplary embodiments with reference to the attached drawings.

BRIEF DESCRIPTION OF THE DRAWINGS

FIGS. 3A to 3C are schematic views each showing the schematic arrangement of a liquid supply apparatus according to the first embodiment of the present invention;

FIGS. 4A and 4B are schematic views each showing the schematic arrangement of a liquid supply apparatus according to the second embodiment of the present invention;

DESCRIPTION OF THE EMBODIMENTS

Exemplary embodiments of the present invention will be described below with reference to the accompanying drawings.

An example will be described below in which a liquid supply apparatus of the present invention is applied to a liquid discharge apparatus in an imprint apparatus. It is possible, however, to apply the liquid supply apparatus of the present invention to any apparatus which supplies a liquid to an object. For example, the liquid supply apparatus of the present invention may be configured as a 2D or 3D printer, or a part thereof or may be configured as a processing apparatus or a part thereof. The shape and property of the object to which the liquid is supplied is not specifically limited. As long as the liquid is in a liquid state at the time of being supplied to the object, it may maintain the liquid state, change to a solid state, or change chemically after being supplied to the object.

The imprint apparatus can be configured to supply, by the liquid supply apparatus, an imprint material (for example, a resin material) as the liquid onto a substrate as the object, bring a mold into contact with the imprint material, and cure the imprint material in that state.

A curable composition (may be referred to as an uncured resin) which is cured by receiving curing energy is used for the imprint material. An electromagnetic wave, heat, or the like is used as the curing energy. For example, light such as infrared light, visible rays, ultraviolet light, or the like whose wavelength is selected from a range of 10 nm (inclusive) to 1 mm (inclusive) is used as the electromagnetic wave.

The curable composition is a composition that is cured by light irradiation or application of heat. Out of these compositions, a photo-curable composition that is cured by light contains at least a polymerizable compound and a photopolymerization initiator, and may contain a non-polymerizable compound or solvent as needed. The non-polymerizable compound is at least a material selected from the group consisting of a sensitizer, a hydrogen donor, an internal mold release agent, a surfactant, an antioxidant, a polymer component, and the like.

The imprint material is applied on a substrate in a film-like shape by a spin coater or a slit coater. Alternatively, a liquid injection head may apply, on the substrate, the imprint material having a droplet-like shape, or an island-like shape or a film-like shape formed by a plurality of droplets connected to each other. The viscosity (viscosity at 25° C.) of the imprint material is set at, for example, 1 mPa·s (inclusive) to 100 mPa·s (inclusive).

Glass, ceramics, a metal, a semiconductor, a resin, or the like is used for the substrate. A member made of a material different from that of the substrate may be formed on the surface of the substrate, as needed. More specifically, a silicon wafer, a compound semiconductor wafer, silica glass, or the like is used as the substrate.

Figure 1:
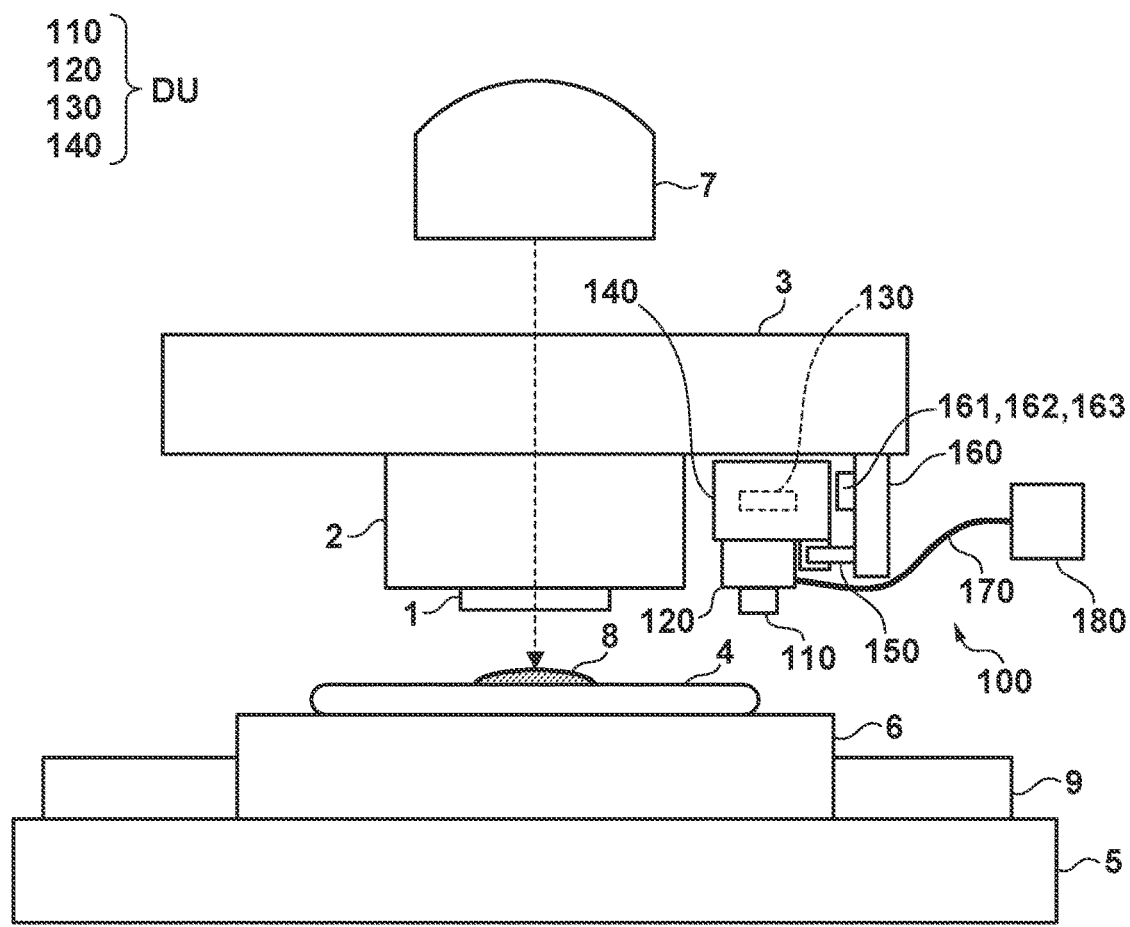
FIG. 1 is a schematic view showing the schematic arrangement of an imprint apparatus according to an embodiment of the present invention.

FIG. 1 shows the schematic arrangement of an imprint apparatus NIL according to an embodiment of the present invention. The imprint apparatus NIL includes a liquid supply apparatus 100 according to the embodiment of a liquid supply apparatus of the present invention. The imprint apparatus NIL supplies, by the liquid supply apparatus 100, a liquid, and more specifically, an imprint material 8 in a liquid state onto a substrate 4, brings a mold 1 into contact with the imprint material 8, and supplies, by a curing unit 7, curing energy (for example, light) to the imprint material 8 in that state. This transfers a pattern formed in the mold 1 to the imprint material 8 on the substrate 4. The pattern formed in the mold 1 may be understood as being transferred to the substrate 4.

In this specification and the accompanying drawings, directions are indicated in an X-Y-Z coordinate system having an X-Y plane in a direction parallel to the surface of the substrate 4 held by a substrate holder 6. Let an X direction, a Y direction, and a Z direction be directions parallel to an X-axis, a Y-axis, and a Z-axis, respectively, in the X-Y-Z coordinate system. Let θX, θY, and θZ, respectively, be rotation about the X-axis, rotation about the Y-axis, and rotation about the Z-axis. Control or driving regarding the X-axis, the Y-axis, and the Z-axis means control or driving regarding the direction parallel to the X-axis, the direction parallel to the Y-axis, and the direction parallel to the Z-axis, respectively. Further, control or driving regarding a θX-axis, a θY-axis, and a θZ-axis means control or driving regarding rotation about an axis parallel to the X-axis, rotation about an axis parallel to the Y-axis, and rotation about an axis parallel to the Z-axis, respectively.

The substrate holder 6 holds the substrate 4. The substrate holder 6 is supported by a base frame 5 and is driven by a substrate driving mechanism 9. The mold 1 is held by a mold holder (not shown) provided in a mold driving mechanism 2 and is driven by the mold driving mechanism 2. The substrate driving mechanism 9 and the mold driving mechanism 2 form an adjusting mechanism which adjusts the relative positions of the substrate 4 and the mold 1. In an example, the substrate driving mechanism 9 drives the substrate holder 6 so as to drive the substrate 4 with respect to a plurality of axes (for example, three axes of the X-axis, the Y-axis, and the θZ-axis), and the mold driving mechanism 2 drives the mold 1 with respect to a plurality of axes (for example, six axes of the X-axis, the Y-axis, the Z-axis, the θX-axis, the θY-axis, and the θZ-axis). A structure 3 supports the mold driving mechanism 2.

The liquid supply apparatus 100 supplies the liquid onto the substrate 4 as the object, and more specifically, supplies the imprint material 8 in the liquid state onto the substrate 4. In addition to FIG. 1, each of FIGS. 2A, 2B, and 3A to 3C shows the liquid supply apparatus 100. The liquid supply apparatus 100 includes dischargers DU each discharging the imprint material 8 in the liquid state and a driving mechanism 150 configured to arrange the dischargers DU at a plurality of positions. The plurality of positions can include, for example, the first position and the second position, and can further include the third position. The first position can be a position where the imprint material 8 is supplied onto the substrate 4. The second position can be a position where the dischargers DU are maintained, for example, a position where the dischargers DU are cleaned. The third position can be a position where the dischargers DU are maintained, for example, a position where components of the dischargers DU are replaced with new components. The dischargers DU can include, for example, a discharge head 110 having an orifice which discharges the imprint material 8, and a tank 120 which holds the imprint material 8 and supplies the imprint material 8 to the discharge head 110. The dischargers DU can also include an electric component 130 which controls discharge of the imprint material 8 from the orifice of the discharge head 110 and a container 140 which houses the electric component 130.

The liquid supply apparatus 100 can include a first exhaust port 161 and a second exhaust port 162, and can further include a third exhaust port 163. The first exhaust port 161 is arranged so as to face the dischargers DU arranged at the first position. The second exhaust port 162 is arranged so as to face the dischargers DU arranged at the second position. The third exhaust port 163 is arranged so as to face the dischargers DU arranged at the third position. Heat generated by the discharger DU (electric component 130) arranged at the first position is exhausted via the first exhaust port 161. Heat generated by the discharger DU (electric component 130) arranged at the second position is exhausted via the second exhaust port 162. Heat generated by the discharger DU (electric component 130) arranged at the third position is exhausted via the third exhaust port 163.

The exhaust ports 161, 162, and 163 can be connected to an exhaust unit 160. The exhaust unit 160 includes a pump, sucks, by the pump, a gas via the exhaust ports 161, 162, and 163, and exhausts it to an external space or an exhaust line after filtering. This can exhaust, via the exhaust ports 161, 162, and 163, the gas whose temperature is increased by heat generated by the exhaust unit 160 (electric component 130). That is, the heat generated by the exhaust unit 160 (electric component 130) can be exhausted via the exhaust ports 161, 162, and 163. An arrangement in which the exhaust unit 160 sucks the gas via the exhaust ports 161, 162, and 163 can contribute to an improvement in cleanliness in the imprint apparatus NIL by sucking a particle, in addition to an operation of keeping the temperature of each discharger DU constant by removing the heat generated by the discharger DU.

The liquid supply apparatus 100 can additionally include a pressure control unit 180. For example, the pressure control unit 180 can be connected to the tank 120 via a pressure tube 170. The pressure control unit 180 can control the pressure of the imprint material 8 in the tank 120 supplied to the discharge head 110 by controlling a pressure applied to the imprint material 8.

An imprint operation by the imprint apparatus NIL will be described. The imprint operation is performed in a state in which the liquid supply apparatus 100 is arranged at the first position (liquid supply position). First, the substrate 4 is placed on and is held by the substrate holder 6. Next, the substrate driving mechanism 9 drives the substrate holder 6 (substrate 4) such that an imprint target region (for example, a shot region) on the substrate 4 is arranged at a position to which the liquid supply apparatus 100 supplies a liquid. In this state, the liquid, and more specifically, the imprint material 8 is discharged from each discharger DU of the liquid supply apparatus 100 and is supplied onto the substrate 4. Typically, the liquid supply apparatus 100 can supply the imprint material 8 in synchronism with driving (scanning) of the substrate holder 6 (substrate 4) by the substrate driving mechanism 9.

Then, the substrate driving mechanism 9 drives the substrate holder 6 (substrate 4) such that the imprint target region (a region to which the imprint material 8 is supplied) on the substrate 4 is arranged under the mold 1. Then, at least one of the substrate driving mechanism 9 and the mold driving mechanism 2 reduces the distance between the substrate 4 and the mold 1 so as to bring the imprint material 8 on the substrate 4 and the mold 1 into contact with each other. At this time, the substrate 4 and the mold 1 can be aligned precisely with respect to the X-axis, the Y-axis, the θX-axis, the θY-axis, and the θZ-axis. This alignment can be performed while an observation apparatus (not shown) observes an alignment mark of the substrate 4 and an alignment mark of the mold 1.

Then, in a state in which the imprint material 8 on the substrate 4 and the mold 1 are in contact with each other, the curing energy (for example, the light) is supplied from the curing unit 7 to the imprint material 8, thereby curing the imprint material 8. Then, at least one of the substrate driving mechanism 9 and the mold driving mechanism 2 increases the distance between the substrate 4 and the mold 1 so as to separate the cured imprint material 8 on the substrate 4 and the mold 1 from each other. This terminates one-cycle imprint operation.

Figure 2A:
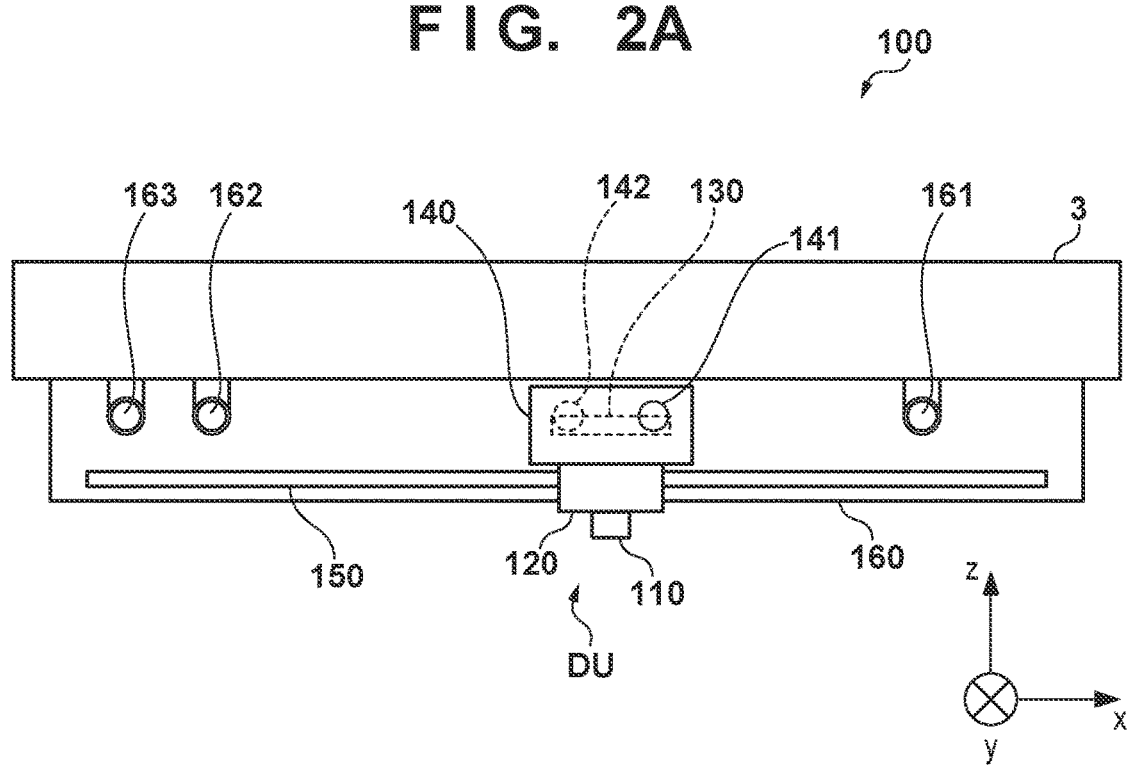
FIGS. 2A and 2B are schematic views each showing the schematic arrangement of a liquid supply apparatus according to the embodiment of the present invention.
Figure 2B:
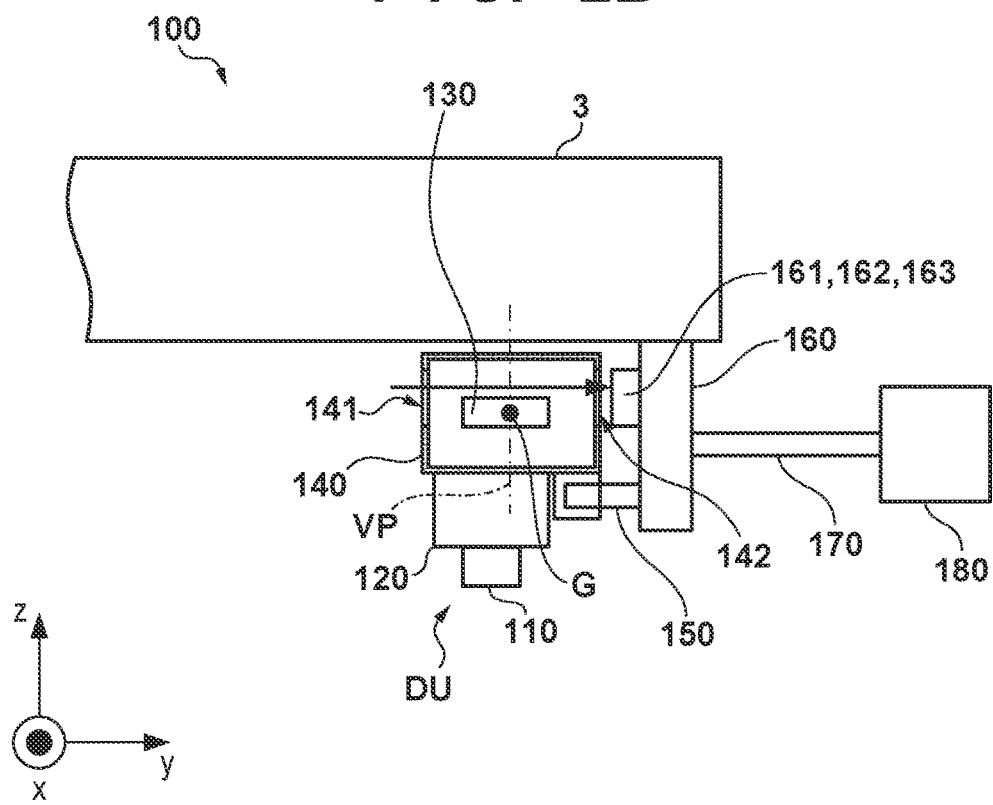
Figure 5A:
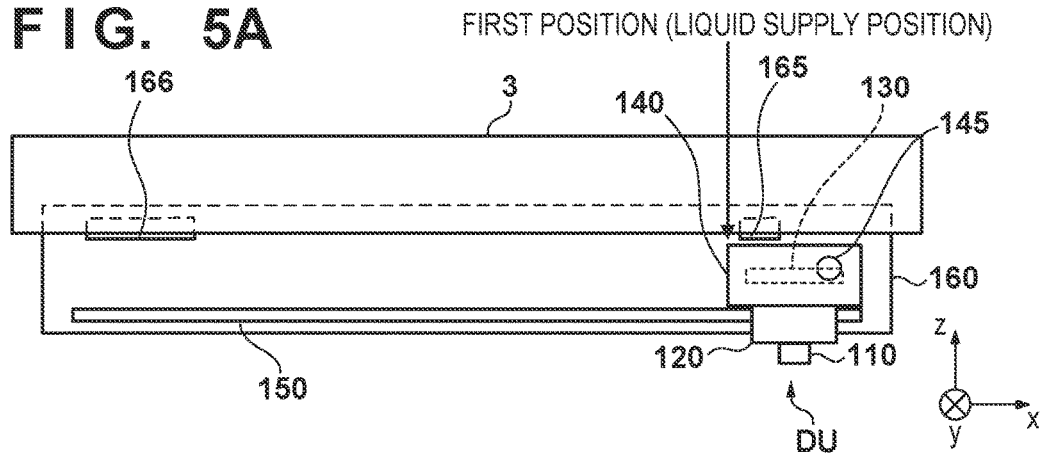
FIGS. 5A to 5C are schematic views each showing the schematic arrangement of a liquid supply apparatus according to the third embodiment of the present invention.
Figure 5B:
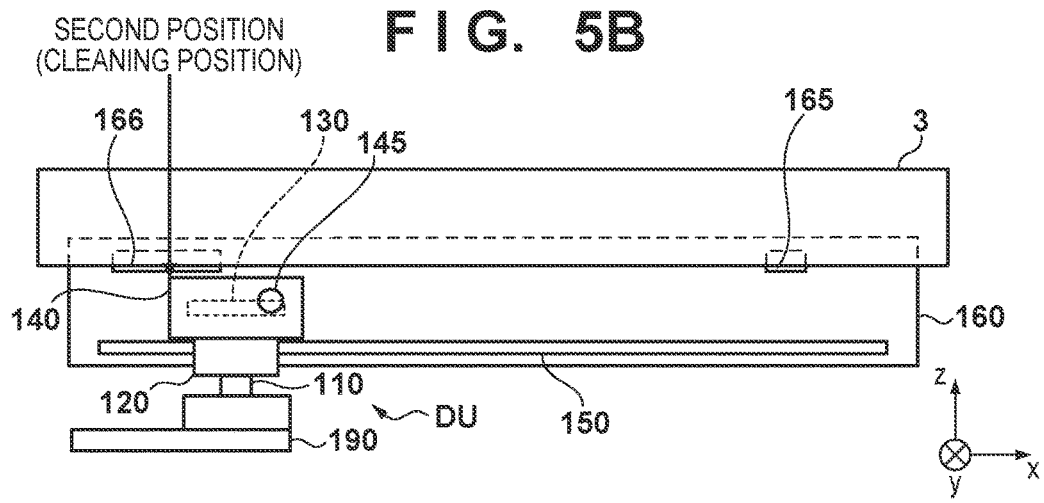
Figure 5C:
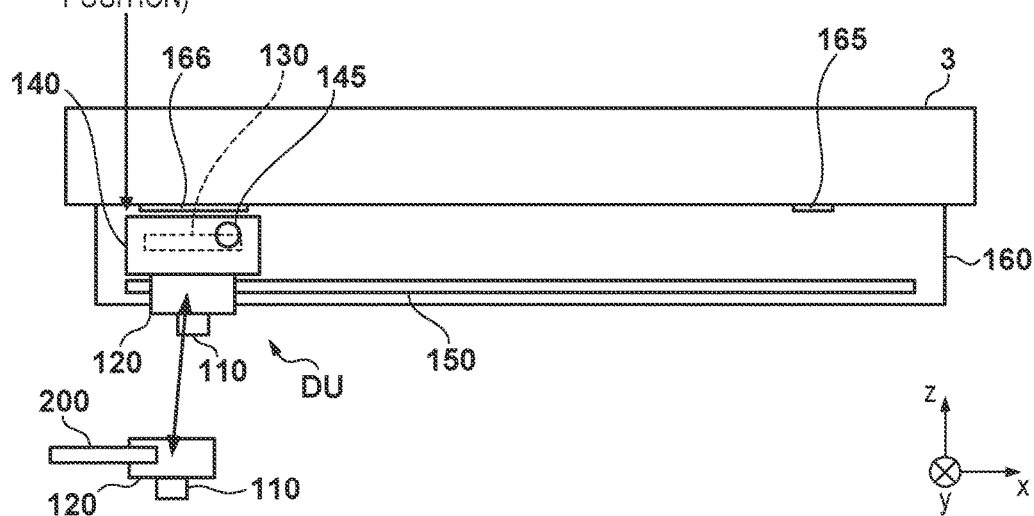

The first embodiment of the present invention will be described below with reference to FIGS. 1 to 3C. Each of FIGS. 1, 2A, 2B, and 3A to 3C schematically shows the arrangement of a liquid supply apparatus 100 according to the first embodiment of the present invention. A diagonally shaded area in FIG. 2B represents the cross section of a container 140. Dischargers DU can include a discharge head 110 having an orifice which discharges an imprint material 8, and a tank 120 which holds the imprint material 8 and supplies the imprint material 8 to the discharge head 110.

The dischargers DU can also include an electric component 130 which controls discharge of the imprint material 8 from the orifice of the discharge head 110 and the container 140 which houses the electric component 130. The container 140 can have a plurality of openings. In the first embodiment, the container 140 has a first opening 141 and a second opening 142 as the plurality of openings.

As schematically shown in FIG. 3A, when the dischargers DU are arranged at the first position, a gas that has entered the container 140 via the first opening 141 is emitted from the container 140 via the second opening 142 and sucked into a first exhaust port 161. As schematically shown in FIG. 3B, when the dischargers DU are arranged at the second position, the gas that has entered the container 140 via the first opening 141 is emitted from the container 140 via the second opening 142 and sucked into a second exhaust port 162. As schematically shown in FIG. 3C, when the dischargers DU are arranged at the third position, the gas that has entered the container 140 via the first opening 141 is emitted from the container 140 via the second opening 142 and sucked into a third exhaust port 163.

As schematically shown in FIG. 2B, the first opening 141 and the second opening 142 of the container 140 can be arranged such that a virtual plane VP passing through a barycenter G of the container 140 is positioned between the first opening 141 and the second opening 142. When the dischargers DU are positioned at the first position, the second position, and the third position, the first opening 141 faces the first exhaust port 161, the second exhaust port 162, and the third exhaust port 163, respectively. According to an arrangement in which the virtual plane VP is positioned between the first opening 141 and the second opening 142, the gas that has entered the container 140 via the first opening 141 passes through the barycenter G of the container 140 and flows toward the second opening 142. The dischargers approach the first exhaust port 161, the second exhaust port 162, and the third exhaust port 163, respectively, when positioned at the first position, the second position, and the third position as described above. This makes it possible to exhaust heat generated by the electric component 130 arranged in the container 140 effectively to the first exhaust port 161, the second exhaust port 162, or the third exhaust port 163 via the second opening 142. That is, according to the above-described arrangement, it is possible to effectively remove the heat generated by the electric component 130 (heat generated by the discharger) arranged in the container 140.

The container 140 and the first exhaust port 161, the second exhaust port 162, and the third exhaust port 163 are not preferably brought into contact with each other because generation of dust may be induced when they are brought into contact with each other. Accordingly, a distance of, for example, about 0.5 to 5 mm can be secured between the container 140 and each of the first exhaust port 161, the second exhaust port 162, and the third exhaust port 163. In order to suppress a pressure loss between the container 140 and each of the first exhaust port 161, the second exhaust port 162, and the third exhaust port 163, each of the first exhaust port 161, the second exhaust port 162, and the third exhaust port 163 may have a structure in which the area of a portion facing the container 140 is increased, like a flange or the like.

Each discharger DU can be configured to supply the imprint material 8 onto the substrate 4 by discharging the imprint material downward when the substrate 4 is arranged below the discharger DU. The container 140 of the discharger DU has the upper surface, the lower surface, and the side surfaces. The discharge head 110 can be arranged below the lower surface of the container 140. The openings 141 and 142 can be arranged on the side surfaces of the container 140.

As described above, the first position can be a position where the imprint material 8 is supplied onto the substrate 4. The second position can be a position where the dischargers DU are maintained, for example, a position where the dischargers DU are cleaned. The third position can be a position where the dischargers DU are maintained, for example, a position where components of the dischargers DU are replaced with new components.

At the second position, for example, a cleaning mechanism 190 can clean the discharge head 110 of the discharger DU. Cleaning can be performed by, for example, removing clogging of an orifice of the discharge head 110 by sucking a liquid from the orifice. More specifically, an arrangement can be adopted in which, for example, a suction nozzle is formed at a position facing the orifice of the discharge head 110, and the liquid is sucked by the suction nozzle. In this suction, a foreign substance in the orifice or its vicinity may be removed by applying a pressure to the liquid in the discharge head 110 and discharging it from the orifice.

Alternatively, cleaning can be performed by wiping the surface of the discharge head 110 with a member such as nonwoven fabric which hardly produces a particle or scrubbing the surface of the discharge head 110 with a blade. Cleaning can be performed not only for a purpose of removing clogging of the orifice but also for a purpose of removing the foreign substance adhered to the orifice and its vicinity. Cleaning can further be performed in order to remove a liquid leaking from the orifice and keep the meniscus of the orifice in a good state.

At the second position, the orifice of the discharge head 110 may be cleaned by discharging (preliminary discharge or dummy discharge of) the liquid from the orifice. For example, the liquid is discharged to a substrate (dummy substrate) different from the substrate 4, a liquid recovery unit, or the like. At this time, clogging of the orifice can be inspected by observing the state of the liquid discharged from the orifice. As a method of observing the liquid, a liquid that has undergone dummy discharge onto the dummy substrate may be observed or the liquid discharged from each discharger may be observed directly. The state of the liquid discharged from each discharger includes, for example, the amount or the volume of the liquid, or the state of clogging of the orifice.

As an arrangement for observing the liquid, an arrangement can be adopted in which a light source such as an LED and a light-receiving element are provided, the liquid is discharged to an optical path between the light source and the light-receiving element, and a change in the amount of light detected by the light-receiving element is detected, thereby detecting an abnormality such as clogging of the orifice. As another arrangement for observing the liquid, an image capturing apparatus (camera) may also be used. An arrangement can be adopted in which, for example, the image capturing apparatus captures the orifice or a surface including the orifice, and an image processing apparatus detects an abnormality in the orifice or the surface including the orifice. Of course, an arrangement may be adopted in which an image captured by the image capturing apparatus is displayed on a monitor screen mounted on an imprint apparatus, and an operator judges an abnormality.

When, for example, the operation of the imprint apparatus is stopped, a cap may be put on the surface including the orifice in order to prevent the orifice from drying or the foreign substance from adhering. It is possible to move the discharge head from the first position to the second position, and then to arrange, on the surface including the orifice, a cap having a shape which covers the surface. The cap may be arranged automatically by using an actuator provided in the imprint apparatus or may be put on manually by the operator. It is also possible to keep the meniscus of the orifice in the good state all the time by periodically discharging the liquid to the cap being put on.

Likewise, various types of maintenance and inspection can be executed at the second position. Assuming the second position as a single spot, all the maintenance and inspection may be performed in the spot. Alternatively, assuming the second positions as a plurality of portions, the maintenance and the inspection may be performed by moving the discharge head to a spot selected from the plurality of portions. Also at this time, heat of the substrate can be dissipated continuously.

Figure 8A:
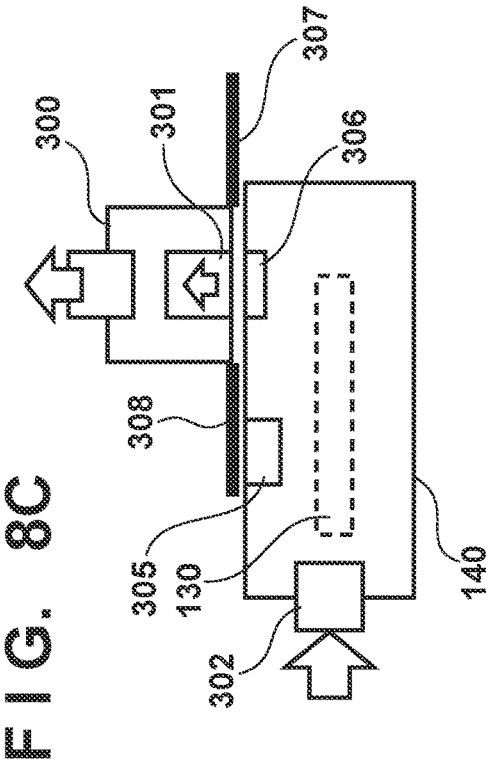
FIGS. 8A to 8D are schematic views each showing the schematic arrangement of the liquid supply apparatus according to the first embodiment of the present invention.
Figure 8C:
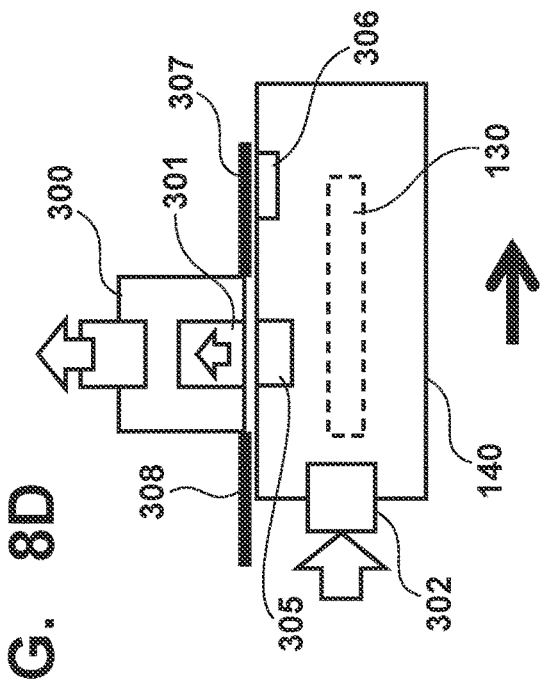
Figure 8B:
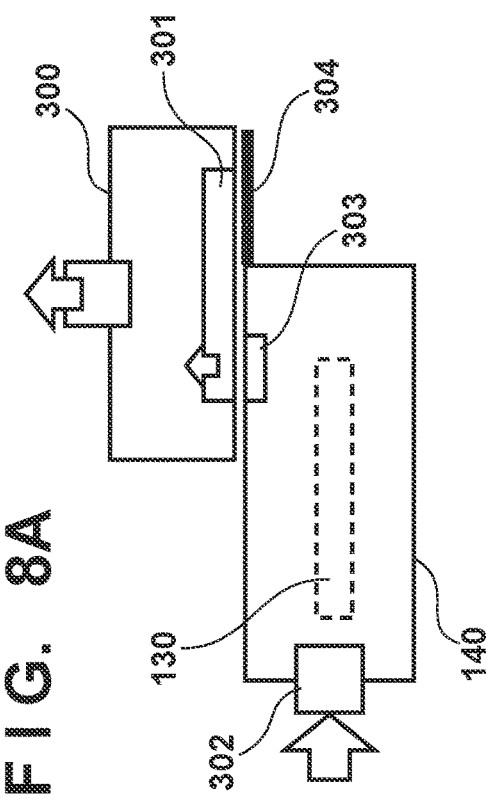

When the second position includes the plurality of spots, it is preferable, as shown in FIGS. 8A and 8B, that an exhaust connection port 301 of an exhaust unit 300 which exhausts heat is opened widely, and an exhaust heat port 303 of the container 140 is connected to (faces) the exhaust connection port 301 regardless of the moving destinations of the container 140. At this time, air inhaled from an opening 302 of the container 140 can be exhausted from the exhaust unit 300 via the exhaust heat port 303 of the container 140 and the exhaust connection port 301 facing the exhaust heat port 303. The dimension of the container 140 may be decided such that the container 140 exists at a position facing the exhaust connection port 301 regardless of the moving destinations of the container 140, or a shielding plate 304 may be provided in the container 140.

Figure 8D:
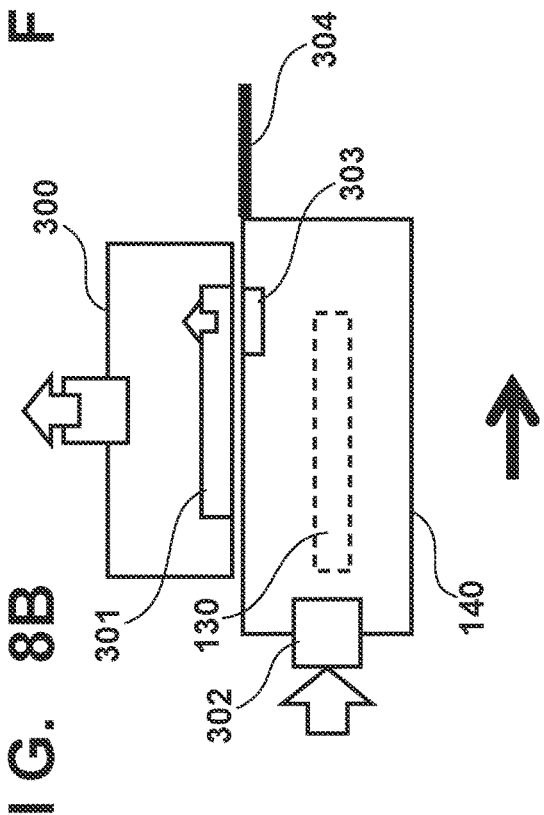

When the second position includes the plurality of spots, an arrangement can be adopted in which one of a plurality of exhaust heat ports 305 and 306 faces the exhaust connection port 301 of the exhaust unit 300 in any of the plurality of spots, as shown in FIGS. 8C and 8D. In this case, a shielding plate 308 can shield the exhaust heat port 305 at a position where the exhaust connection port 301 and the exhaust heat port 306 of the container 140 are connected, as shown in FIG. 8C. Similarly, a shielding plate 307 can shield the exhaust heat port 306 at a position where the exhaust connection port 301 and the exhaust heat port 305 are connected, as shown in FIG. 8D. As described above, when the container 140 includes the plurality of exhaust heat ports (305 and 306), an arrangement can be adopted in which the shielding plates (307 and 308) are provided around the exhaust connection port 301 on the side of the exhaust unit 300.

Each shielding plate suffices as long as a surface facing an opening surface is formed and may not have a plate shape. Each shielding plate may be a part of the exhaust unit 300 or may be provided separately from the exhaust unit 300.

A distance of about 0.5 to 5 mm can be secured for the spacing between each shielding plate and an opening portion.

At the third position, for example, a replacing mechanism 200 can replace the tank 120 and/or the discharge head 110 with the new component. Note that when the discharge head 110 is inseparably integrated with the tank 120, a component obtained by integrating the discharge head 110 and the tank 120 with each other can be replaced with the new component. When the tank 120 and/or the discharge head 110 is replaced with the new component, power supply to the electric component 130 can be shut off. In this case, sucking from the third exhaust port 163 is preferably continued in order to exhaust, from the container 140, a particle that may be generated by a replacement operation though the electric component 130 does not generate new heat. At the third position, the replacing mechanism 200 may replace another component, for example, the electric component 130 with a new component.

The second embodiment of the present invention will be described with reference to FIGS. 4A and 4B. Matters that are not mentioned in the second embodiment can comply with the first embodiment. In the second embodiment, a form in which a first opening 143 and a second opening 144 provided in a container 140 are utilized is different from that in the first embodiment.

When dischargers DU are arranged at the first position, a gas that has entered the container 140 via the first opening 143 is emitted from the container 140 via the second opening 144 and sucked into a first exhaust port 164A connected to an exhaust unit 160. On the other hand, when the dischargers DU are arranged at the second position, the gas that has entered the container 140 via the second opening 144 is emitted from the container 140 via the first opening 143 and sucked into a second exhaust port 164B connected to the exhaust unit 160. In this manner, the first opening 143 functions as a suction port which sucks the gas into the container 140 at the first position and functions as an exhaust port which exhausts the gas in the container 140 at the second position. On the other hand, the second opening 144 functions as an exhaust port which exhausts the gas in the container 140 at the first position and functions as a suction port which sucks the gas into the container 140 at the second position.

Also in the second embodiment, the first opening 143 and the second opening 144 of the container 140 can be arranged such that a virtual plane passing through the barycenter of the container 140 is positioned between the first opening 143 and the second opening 144. A distance of, for example, about 0.5 to 5 mm can be secured between the container 140 and each of the first exhaust port 164A and the second exhaust port 164B in order to prevent generation of dust caused by bringing the container 140, and the first exhaust port 164A and the second exhaust port 164B into contact with each other. In order to suppress a pressure loss between the container 140 and each of the first exhaust port 164A and the second exhaust port 164B, each of the first exhaust port 164A and the second exhaust port 164B may have a structure in which the area of a portion facing the container 140 is increased, like a flange or the like.

The third embodiment of the present invention will be described with reference to FIGS. 5A to 5C, 6A, 6B, 7A, and 7B. A diagonally shaded area in each of FIGS. 6A, 6B, 7A, and 7B represents the cross section of a container 140. Matters that are not mentioned in the third embodiment can comply with the first embodiment. In the third embodiment, an exhaust port from which heat generated by dischargers DU is exhausted when the dischargers DU are arranged at the second position and an exhaust port from which heat generated by the dischargers DU is exhausted when the dischargers DU are arranged at the third position are common to each other. That is, the heat generated by the dischargers DU when the dischargers DU are arranged at the second position and when the dischargers DU are arranged at the third position is exhausted via a common second exhaust port 166. From the viewpoint of a gas flow, a gas in the container 140 of the discharger DU is exhausted via the common second exhaust port 166 when the dischargers DU are arranged at the second position and when the dischargers DU are arranged at the third position.

The container 140 has a first opening 145 and a second opening 146. In an example, the first opening 145 can be arranged on the side surface of the container 140, and the second opening 146 can be arranged on the upper surface of the container 140. When the dischargers DU are arranged at the first position, a gas that has entered the container 140 via the first opening 145 is emitted from the container 140 via the second opening 146 and sucked into a first exhaust port 165 connected to an exhaust unit 160. On the other hand, when the dischargers DU are arranged at the second position and when the dischargers DU are arranged at the third position, the gas that has entered the container 140 via the first opening 145 is emitted from the container 140 via the second opening 146 and sucked into the second exhaust port 166 connected to the exhaust unit 160.

Figure 6A:
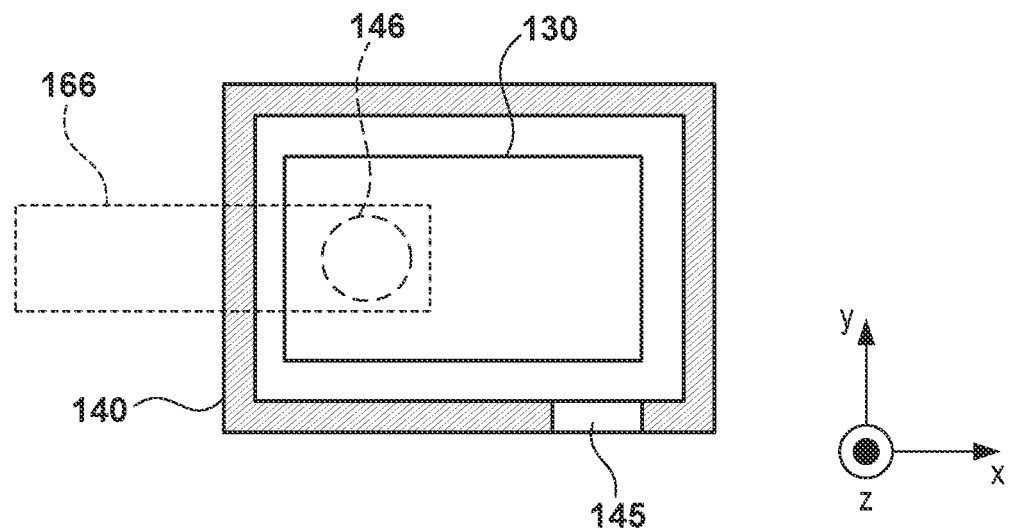
FIGS. 6A and 6B are schematic views each showing the schematic arrangement of a liquid supply apparatus according to the third embodiment of the present invention.
Figure 6B:
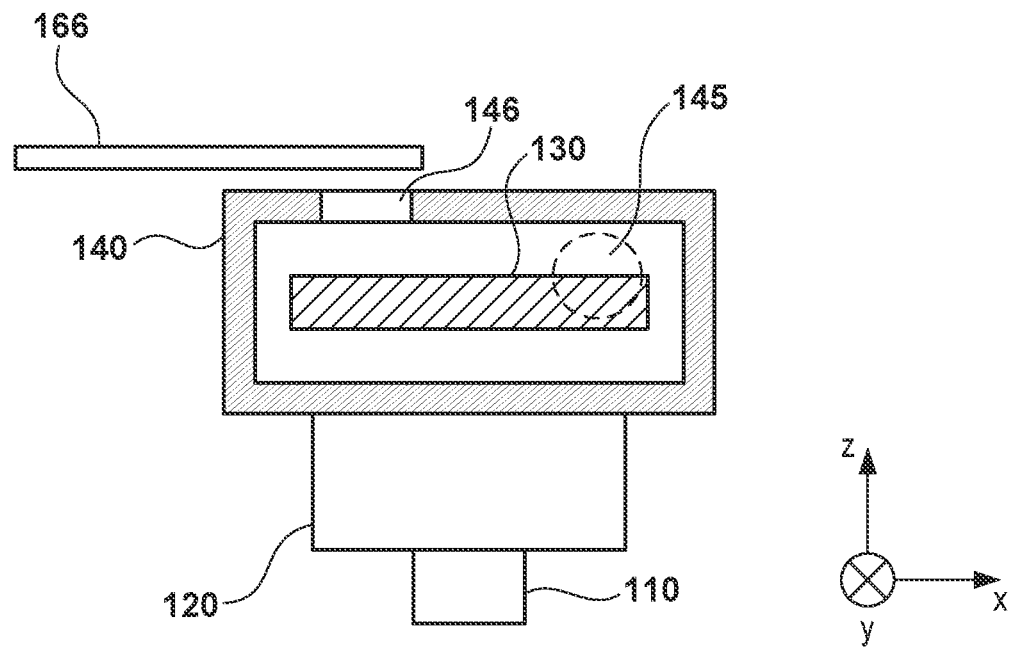
Figure 7A:
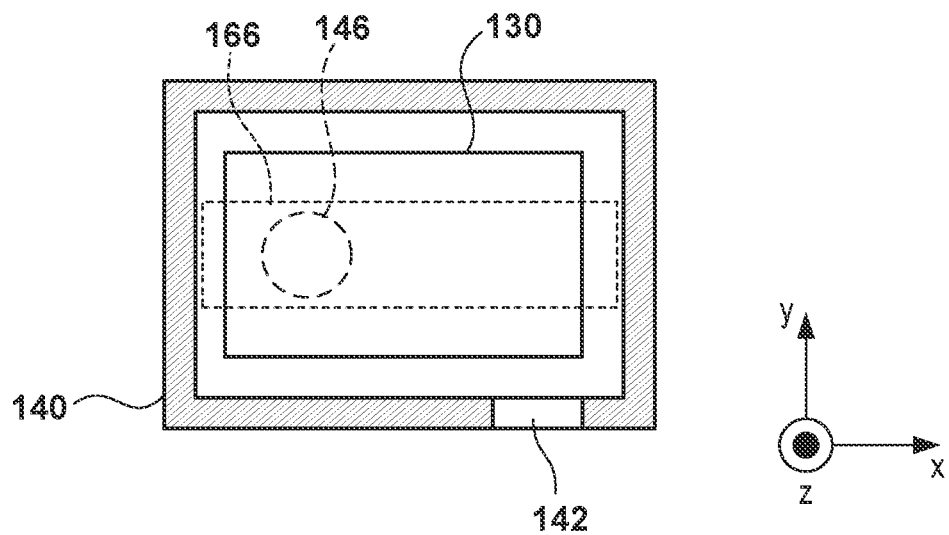
FIGS. 7A and 7B are schematic views each showing the schematic arrangement of the liquid supply apparatus according to the third embodiment of the present invention.
Figure 7B:
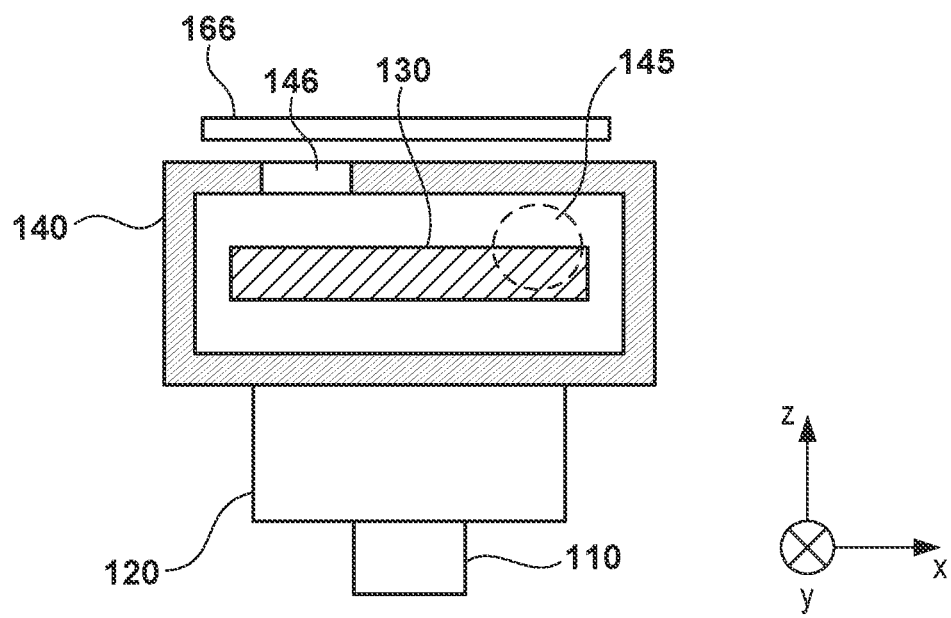

Each of FIGS. 6A and 6B schematically shows the positional relationship between the second exhaust port 166 and the second opening 146 of the container 140 when the dischargers DU are arranged at the second position. Each of FIGS. 7A and 7B schematically shows the positional relationship between the second exhaust port 166 and the second opening 146 of the container 140 when the dischargers DU are arranged at the third position. The second exhaust port 166 has a size facing the dischargers DU both when the dischargers DU are arranged at the second position and when the dischargers DU are arranged at the third position. Then, the heat generated by the dischargers DU is exhausted via the second exhaust port 166 both when the dischargers DU are arranged at the second position and when the dischargers DU are arranged at the third position.

The first opening 145 and the second opening 146 of the container 140 can be arranged such that a virtual plane passing through the barycenter of the container 140 is positioned between the first opening 145 and the second opening 146. The container 140, and the first exhaust port 165 and the second exhaust port 166 are not preferably brought into contact with each other because generation of dust may be induced when they are brought into contact with each other. A distance of, for example, about 0.5 to 5 mm can be secured between the container 140 and each of the first exhaust port 165 and the second exhaust port 166 in order to prevent generation of the dust caused by bringing the container 140, and the first exhaust port 165 and the second exhaust port 166 into contact with each other.

An example will be described below in which a liquid supply apparatus of the present invention is configured as a printer or a part thereof. In this case, the liquid supply apparatus supplies ink as a liquid to a sheet such as a piece of paper, thereby forming an image on the sheet. The image can be formed by discharging the ink toward the sheet from the dischargers DU while a driving mechanism 150 drives the dischargers DU. The first position can be, for example, a part or all of the moving range of the dischargers DU when the image is formed. Additionally, the liquid supply apparatus of the present invention may supply a liquid onto a support table and be applied to a 3D printer which forms a three-dimensional structure. Alternatively, the liquid supply apparatus of the present invention may be applied to a processing apparatus which processes an object by supplying a process liquid (for example, etchant) to a position targeted by the object.

A manufacturing method of a device (a semiconductor integrated circuit device, a liquid crystal display device, or the like) as an article includes a step of forming a pattern on a substrate (a wafer, a glass plate, or a film-like substrate) by using the above-described imprint apparatus. The manufacturing method can also include a step of processing (for example, etching) the substrate onto which the pattern has been formed. Note that when manufacturing another article such as a patterned media (storage medium) or an optical element, the manufacturing method can include, instead of etching, another process of processing the substrate onto which the pattern has been formed. The method of manufacturing the article according to this embodiment is superior to a conventional method in at least one of the performance, quality, productivity, and production cost of the article.

A pattern of a cured product formed by using an imprint apparatus is used permanently for at least some of various articles or used temporarily when the various articles are manufactured. The article includes an electric circuit element, an optical element, a MEMS, a printing element, a sensor, a mold, or the like. The electric circuit element includes, for example, a volatile or nonvolatile semiconductor memory such as a DRAM, an SRAM, a flash memory, or an MRAM or a semiconductor element such as an LSI, a CCD, an image sensor, or an FPGA. The mold includes, for example, an imprinting mold.

The pattern of the cured product is used without any change as a constituent member of at least part of the above-described article or used temporarily as a resist mask. The resist mask is removed after etching, ion implantation, or the like is performed in a processing step of the substrate.

Figure 9A:
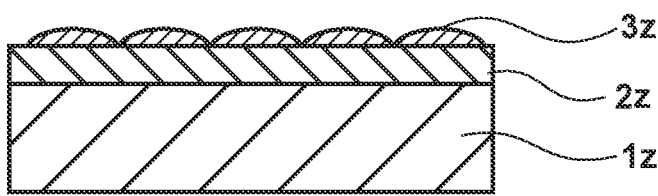
FIGS. 9A to 9F are views for explaining a method of manufacturing an article.

A detailed method of manufacturing the article will now be described. As shown FIG. 9A, a substrate 1z such as a silicon wafer having a processing target material 2z such as an insulator formed on its surface is prepared, and then an imprint material 3z is applied on the surface of the processing target material 2z by an inkjet method or the like. A state is shown here in which the imprint material 3z formed into a plurality of droplets is applied on the substrate.

Figure 9B:
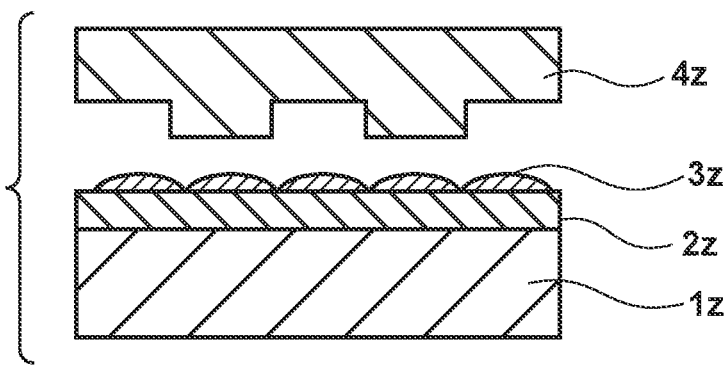
Figure 9C:
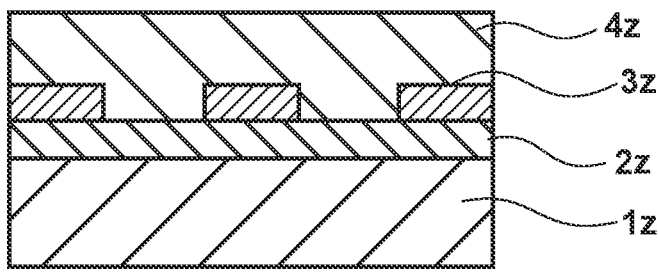

As shown in FIG. 9B, a side of an imprinting mold 4 on which its three-dimensional pattern is formed faces the imprint material 3z on the substrate. As shown in FIG. 9C, a mold 4z and the substrate 1z to which the imprint material 3z is applied are brought into contact with each other, and a pressure is applied. The imprint material 3z fills the gap between the mold 4z and the processing target material 2z. The imprint material 3z is cured by irradiating it with light as curing energy through the mold 4z in this state.

Figure 9D:
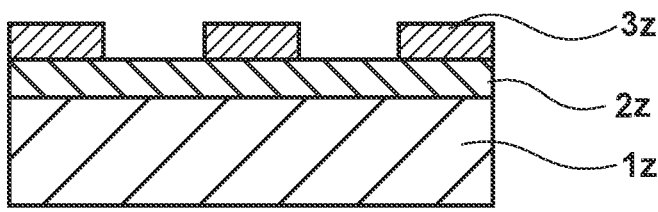

As shown in FIG. 9D, the pattern of the cured product of the imprint material 3z is formed on the substrate 1z by releasing the mold 4z and the substrate 1z from each other after curing the imprint material 3z. The pattern of this cured product has a shape conforming to the concave portion of the mold corresponding to the convex portion of the cured product. That is, the three-dimensional pattern of the mold 4z is transferred to the imprint material 3z.

Figure 9E:
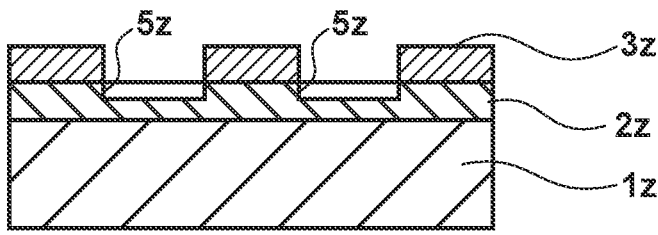
Figure 9F:
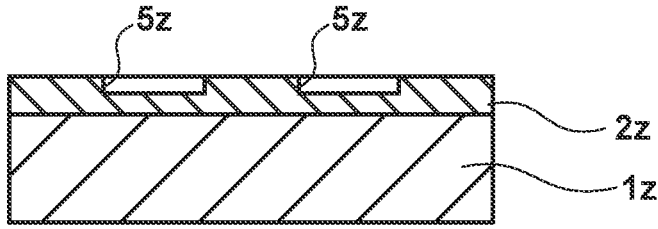

As shown in FIG. 9E, out of the surface of the processing target material 2z, portions without the cured product or portions where the cured products remain thin are removed and become trenches 5z by performing etching using the pattern of the cured product as an etching resistant mask. As shown in FIG. 9F, an article having the trenches 5z formed in the surface of the processing target material 2z can be obtained by removing the pattern of the cured product. The pattern of the cured product is removed here. However, the pattern of the cured product may be utilized as, for example, an interlayer dielectric film included in the semiconductor element or the like, that is, the constituent member of the article without removing it after processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-218794, filed Nov. 6, 2015, and 2016-208037, filed Oct. 24, 2016, which are hereby incorporated by reference herein in their entirety.

What is claimed is:

1. A liquid supply apparatus which supplies a liquid to an object, the apparatus comprising:
   a discharger configured to discharge a liquid;
   a driver configured to arrange the discharger at a plurality of positions including a first position and a second position;
   a first exhaust port arranged so as to face the discharger arranged at the first position and configured to exhaust, by sucking a gas from the discharger into the first exhaust port, heat generated by the discharger arranged at the first position; and
   a second exhaust port arranged so as to face the discharger arranged at the second position and configured to exhaust, by sucking a gas from the discharger into the second exhaust port, heat generated by the discharger arranged at the second position.

2. The apparatus according to claim 1, wherein the discharger includes a discharge head having an orifice configured to discharge a liquid, an electric component configured to control discharge of the liquid from the orifice, and a container configured to house the electric component,
   the container has a plurality of openings,
   when the discharger is arranged at the first position, a gas that has entered the container via at least one of the plurality of openings is emitted from the container via at least one of remaining ones of the plurality of openings and sucked into the first exhaust port, and
   when the discharger is arranged at the second position, the gas that has entered the container via the at least one of the plurality of openings is emitted from the container via the at least one of the remaining ones of the plurality of openings and sucked into the second exhaust port.

3. The apparatus according to claim 2, wherein the plurality of openings include a first opening and a second opening,
   when the discharger is arranged at the first position, the gas that has entered the container via the first opening is emitted from the container via the second opening and sucked into the first exhaust port, and
   when the discharger is arranged at the second position, the gas that has entered the container via the first opening is emitted from the container via the second opening and sucked into the second exhaust port.

4. The apparatus according to claim 3, wherein the first opening and the second opening are arranged such that a virtual plane passing through a barycenter of the container is positioned between the first opening and the second opening.

5. The apparatus according to claim 2, wherein the plurality of openings include a first opening and a second opening,
   when the discharger is arranged at the first position, the gas that has entered the container via the first opening is emitted from the container via the second opening and sucked into the first exhaust port, and
   when the discharger is arranged at the second position, the gas that has entered the container via the second opening is emitted from the container via the first opening and sucked into the second exhaust port.

6. The apparatus according to claim 2, wherein the discharger is configured to supply a liquid to the object by discharging the liquid downward when the object is arranged below the discharger, and the container has an upper surface, a lower surface, and side surfaces, the discharge head is arranged below the lower surface of the container, and the plurality of openings are arranged on the side surfaces.

7. The apparatus according to claim 1, wherein the plurality of positions include a third position, the second exhaust port has a size such that the second exhaust port faces the discharger both when the discharger is arranged at the second position and when the discharger is arranged at the third position, and heat generated by the discharger is exhausted via the second exhaust port both when the discharger is arranged at the second position and when the discharger is arranged at the third position.

8. The apparatus according to claim 7, further comprising a cleaner configured to clean the discharger; and a replacer configured to replace a component of the discharger with a new component, wherein the first position is a position where the discharger performs a process of supplying the liquid to the object, the second position is a position where the cleaner cleans the discharger, and the third position is a position where the replacer replaces the component with the new component.

9. The apparatus according to claim 1, further comprising a cleaner configured to clean the discharger, wherein the first position is a position where the discharger performs a process of supplying the liquid to the object, and the second position is a position where the cleaner cleans the discharger.

10. The apparatus according to claim 1, further comprising an image capturing device configured to capture an image of the liquid discharged from the discharger, wherein the first position is a position where the discharger performs a process of supplying the liquid to the object, and the second position is a position where the image capturing device captures the image of the liquid discharged from the discharger.

11. The apparatus according to claim 1, wherein the first position is a position where the discharger performs a process of supplying the liquid to the object, and wherein heat generated by the discharger is exhausted by the first exhaust port while the discharger is arranged at the first position and performs the process of supplying the liquid to the object.

12. The apparatus according to claim 1, wherein the driver is configured to move the discharger along a line on which the first position and the second position are arranged, wherein the discharger includes a discharge head having an orifice configured to discharge the liquid, an electric component configured to control discharge of the liquid from the orifice, and a container configured to house the electric component, wherein the container has a surface parallel to the line, the surface having an opening, the first exhaust port facing the opening of the surface of the container arranged at the first position.

13. The apparatus according to claim 1, further comprising an exhaust path to which the first exhaust port and the second exhaust port are connected, the exhaust path extending along a line on which the first position and the second position are arranged.

14. An imprint apparatus which brings a mold into contact with an imprint material on a substrate and cures the imprint material, the apparatus comprising a liquid supply apparatus including:

a discharger configured to discharge the imprint material to supply the imprint material on the subject;

a driver configured to arrange the discharger at a plurality of positions including a first position and a second position;

a first exhaust port arranged so as to face the discharger arranged at the first position and configured to exhaust, by sucking a gas from the discharger into the first exhaust port, heat generated by the discharger arranged at the first position; and a second exhaust port arranged so as to face the discharger arranged at the second position and configured to exhaust, by sucking a gas from the discharger into the second exhaust port, heat generated by the discharger arranged at the second position.

* * * * *